Sept. 22, 1936.  K. E. LYMAN  2,055,178
AUTOMATIC CLUTCH
Filed Aug. 30, 1933  2 Sheets-Sheet 1
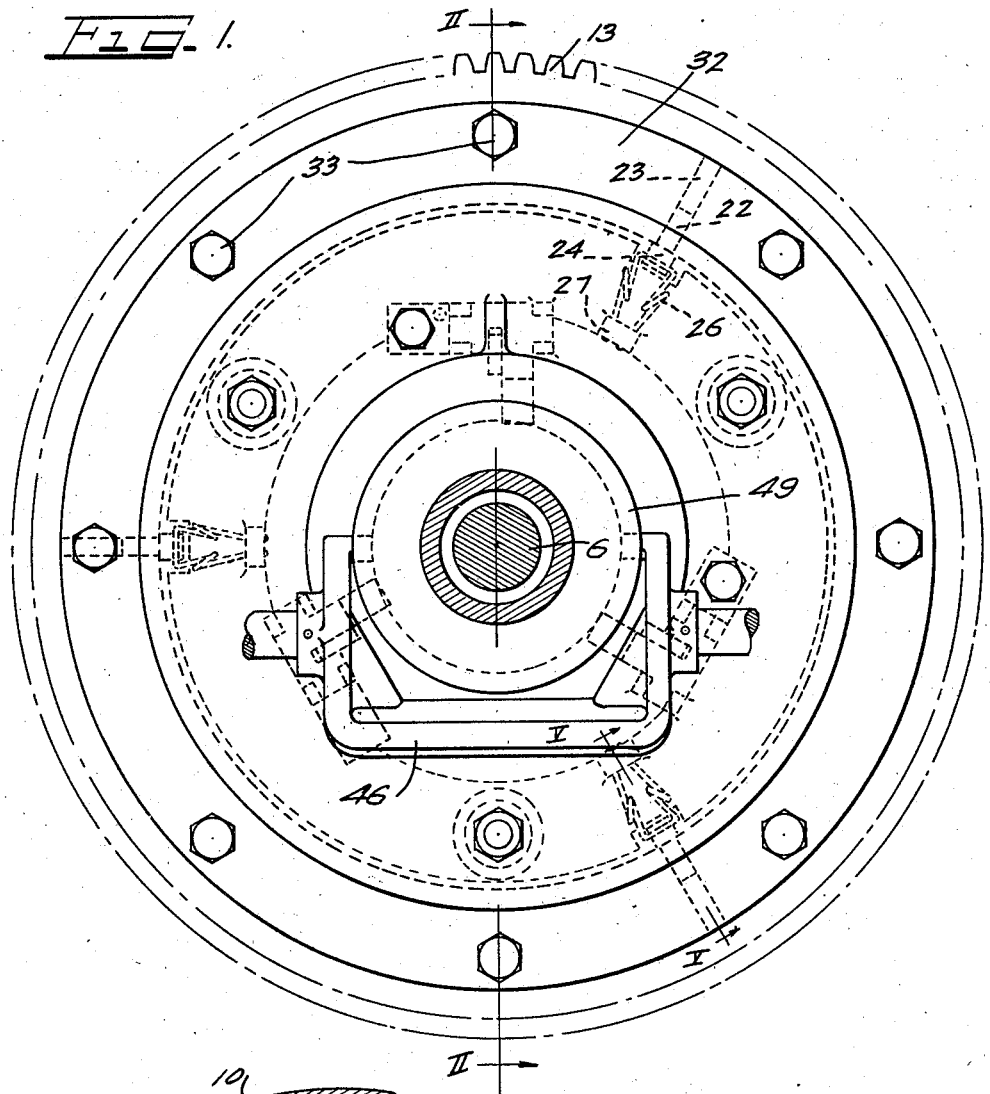
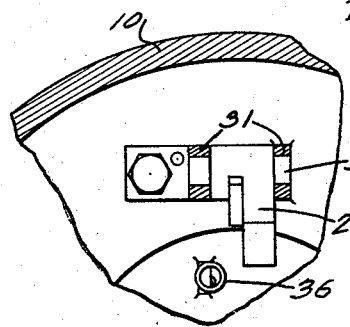
Inventor
KENNETH E. LYMAN.

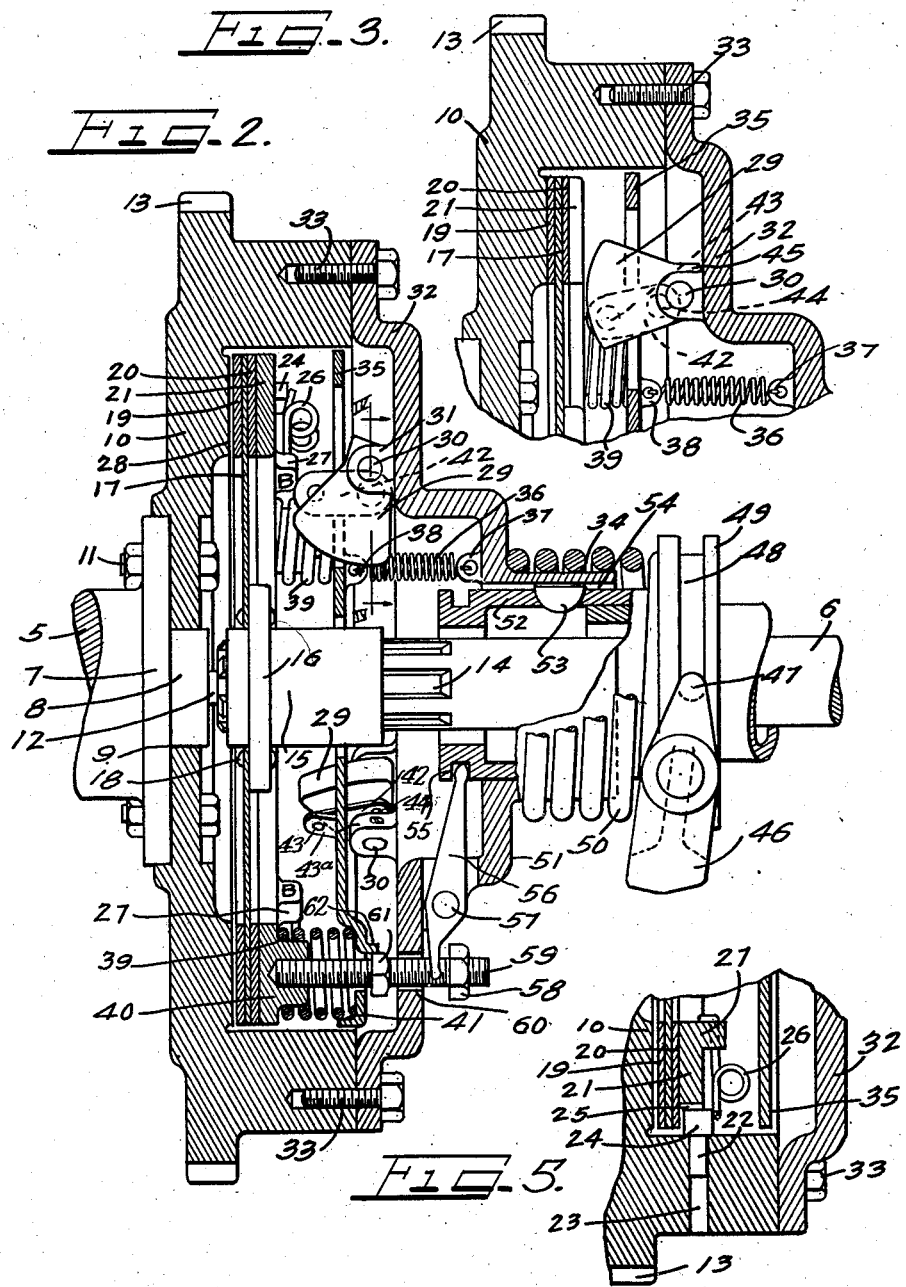

Patented Sept. 22, 1936

2,055,178

UNITED STATES PATENT OFFICE 2,055,178

AUTOMATIC CLUTCH

Kenneth E. Lyman, Lake Forest, Ill.

Application August 30, 1933, Serial No. 687,433

6 Claims. (Cl. 192—105)

The present invention relates in general to clutching mechanisms for power shafts and has particular reference to an improvement in automatic mechanisms of this character which is especially adapted for use in connection with the power shafts of automobiles and other such machines wherein it is necessary to disconnect the drive between driving and driven shafts.

The primary object of the invention is to provide a mechanism of the class described which may be economically manufactured; which will be positive and reliable in use; which will require little or no servicing outside of adjustment to compensate for wear on the friction parts and which may be used in conventional types of automobile assemblies.

While the foregoing briefly explains the nature of the present improvements, other objects and advantages not herein specifically referred to will be readily appreciated upon a full comprehension of the novel features presented in the construction, arrangement and manner of operation of the clutch.

In order that the invention may be readily understood, an embodiment of the same is set forth in the accompanying drawings, and in the following detailed description.

It is understood that those skilled in the art may make various changes in the construction and arrangement of the parts without departing from the spirit and scope of the invention as defined in the subjoined claims, and I therefore do not wish to be restricted to the precise construction contained herein.

In said drawings:

Figure 1 is a view in end elevation of a mechanism embodying my invention.

Figure 2 is a section taken on the line II—II, Figure 1.

Figure 3 is a detailed view of a portion of the mechanism illustrating the active position of the centrifugal operating means which renders the clutch automatic in its action.

Figure 4 is a detailed view in section on the line IV—IV, Fig. 2.

Figure 5 is a detailed view in section on the line V—V, Fig. 1.

Referring now to the drawings in detail: 5 represents a driving shaft and 6 a driven shaft. As is customary, it is intended that the driving shaft 5 be connected to a prime mover such as an internal combustion engine or any other power source and the shaft 6 will be connected to the load to be driven.

The shaft 5 is made with a flange 7 and terminates with a reduced diameter 8 which projects through the center opening 9 in the side of a drum like structure 10, preferably a flywheel. The flange 7 is secured to the flywheel by means of bolts or the like 11. Provided in the reduced diameter 8 of the shaft 5 is an internal bore made to accommodate the pilot 12 on the extremity of the driven shaft 6. The internal bore in this connection is equipped with an anti-friction bearing, not shown, so as to allow relative rotation without undue friction of the shafts 5 and 6 when the clutch is disengaged.

Since the special field of utility for the invention is in connection with motor vehicles, I have elected to illustrate the same in combination with a flywheel and for this reason, the self-starter teeth 13 are shown on the flywheel.

Axially slidable on the splined area 14 of the driven shaft 6 is a collar 15 which is made with a radial flange 16 to provide a support or mounting for the sheet metal plate 17 of the driven clutching element. This plate 17 is fixed to the flange 16 by means of rivets or the like 18. The plate 17 is circular in shape and is backed on one side by a ring like layer of friction material 19 and on the other side by a similar ring 20 which is interposed between the plate 17 and the pressure ring 21. The pressure ring 21 is mounted for rotation with the flywheel 10, at least it is held against relative rotation by any means suitable for the purpose, preferably by headed pins or the like 22 (see Fig. 5) which are set in openings 23 in the flywheel so that the heads 24, thereof, may seat in slots 25 in the periphery of the pressure ring 21. There will preferably be three of these retaining devices and each will be equipped with a spring device 26, one end of which will bear against the heads 24, the opposite ends being secured by ears 27 projecting from the face of the pressure ring. The driving connection between the driving and driven clutching elements will be effected when a thrust is imparted to the pressure ring 21 to move the same forwardly in the direction of the driving shaft 5. When this happens, the ring of friction material 19 will be moved into abutting relation with the fixed surface 28 on the flywheel so that the sheet metal plate 17 is clamped to rotate with the driving shaft 5 and since it is fixed on the collar 15 which is splined on the driven shaft, the driving and driven shafts will thus be connected in driving relation.

The driven clutching element by means of this construction is mounted for axial sliding movement on the splined area 14 of the driven shaft 6.

To shift the driven clutching element automatically, I have devised a centrifugally responsive device or devices and assembled the same in combination with a link motion so that when the centrifugal device or devices move outwardly in response to the speed of the driving shaft, the link motions connected therewith will impart the desired thrust to the pressure ring 21. In the preferred construction I use three of these centrifugal devices comprising the weights 29. Each weight is pivotally mounted as at 30 in a bifurcated ear 31 and with the ears projecting from the inside face of a cover plate 32. The cover plate is secured to the flywheel 10 by means of bolts or the like 33 and has preferably a plurality of stepped diameters, the smallest of which, shown at 34, comprising a collar or the like.

Concentrically mounted relatively to the driven clutching element and housed within the flywheel is a follower plate 35. This plate is connected to the cover plate by means of the springs 36, one end of each spring being fixed to the projecting ears 37 on the cover plate and the opposite ends being fixed to ears 38 on the plate 35. The plate is spaced from the pressure ring 21 by means of the springs 39. There are preferably three of these springs 39 and the pressure ring 21 is made with bosses 40 providing seats for similar ends of the springs 39 with the opposite ends of the springs seated in cupped depressions 41 provided in the plate 35.

The thrust or pressure imparted to the pressure ring 21 is transmitted first through the follower plate 35, then through the springs 39. The plate 35 like the driven clutching element is axially shiftable and since the pressure ring 21 is spaced from the follower plate 35 by spring devices, both the follower 35 and the pressure ring are shiftable against the yielding influence of the springs 26, and the springs 26 together with the springs 36 automatically declutch the mechanism when the centrifugal force of the weights 29 is below a predetermined minimum. In other words, when the flywheel 10 is rotated and its speed of rotation is sufficient to throw out the weights 29 to an extent sufficient to overcome the resistance of the springs 26 and 36, the weights will impart the necessary thrust to throw the clutch in.

The effective leverage of the weights is transmitted to the follower 35 through link motions as now described. These link motions each preferably comprises a link member 42, one end of which is pivoted as at 43 to an ear 43a projecting from one face of the follower 35 with the opposite end of the link pivoted as at 44 to its respective weight 29. The relative position of the pivot centers 30, 43 and 44 is of importance in order to realize the desired effectiveness of the thrust to be imparted, as well as to prevent the links from moving into a position which would carry the axis of pivot 44 past the plane through the axes of pivots 30 and 43. For this reason, the center of the pivot 44, when the clutch is out, will be ordinarily in the same transverse plane as the center of the pivot 30. As the weights move outwardly about their fixed pivots 30, the links will move forward and the center of the pivot 44 will have a concentric movement about the pivot 30. At the limit of the movement of the links, the relative position of the centers of the pivots 30 and 44 will be substantially as shown in Fig. 3. In this position the clutch is engaged and the centers of both the pivots 43 and 44 are below a horizontal plane through the center of the pivot 30. In this way whenever the speed of the driving shaft decreases to an extent whereby the springs will overcome the centrifugal force of the weights, the weights may move inwardly and there will be no danger of the weights being locked in the extended positions.

At the same time the angle of the links relative to the center of the pivots 30 will be sufficient to develop a decided thrust when the same is required and in this connection attention is called to the fact that this decided positive thrust is realized with relatively small weights. To limit the movement of the links as well as the weights, the corner 45 of each weight is adapted to abut against a stop. These stops limit the throw of the weights and also the extended position of the links.

In addition to the automatic control I have also provided means for manually disengaging the clutch. This manual manipulation is performed preferably by a hand or foot manipulated yoke 46 having a pair of diametrically opposed trunnion pins 47 seated in an annular groove 48 in an axially shiftable collar 49. Wound around the sleeve 34 of the cover 32 is a compression spring 50. The spring bears against the shoulder 51 on the cover 32 and against the collar 49, tending to retain the collar 49 at the limit of its extended position to the right, as viewed from Fig. 2. The collar 49 is made with a forwardly extending sleeve 52 which is locked against rotation in the sleeve 34 of the cover 32 by a key 53 projecting into a keyway 54 on the inside of the sleeve 34.

The sleeve 52 is thus mounted for an axially sliding movement together with the collar 49 and against the resistance of the spring 50 but prevented from rotation. Seated in an annular groove 55 in the extremity of the sleeve 52 is one end of a rocker arm or finger 56, the same being pivoted as at 57 with its opposite end presented behind a nut 58 on the threaded headless bolt 59. Any number of these actuating fingers 56 may be employed to meet requirements. This is also true of the bolts 59.

The bolts 59 extend through openings 60 in the cover 32 through the follower plate 35 and seat in axial bores made to receive them in the bosses 40 on the pressure ring 21. These shafts provide a guide for the follower plate 35 and since they are preferably threaded or otherwise fixed to the pressure ring 21, they are adapted to shift the pressure ring axially in response to movement of the actuating fingers 56.

Manual manipulation of the collar 49 to shift the same axially will rock the fingers 56 on their pivots 57, moving the fingers into engagement with the nuts 58 on the bolts 59, thus exerting a backward thrust to the bolts 59 and moving the pressure ring 21 into a neutral position or a declutched position, so to speak.

This additional control is provided primarily for the purpose of declutching the mechanism, should the automatic control fail to respond for any reason. Furthermore, the manual control may be used whenever desired and is operable regardless of the position of the weights.

To adjust the mechanism to compensate for wear on the friction clutching elements, the bolts 59 may be turned to the right or left depending on the adjustment required and in this connection, attention is called to the nuts 61 on the bolts bearing against struck up lugs 62 on the follower plate 35. These lugs 62 prevent the nut 61 from turning. By turning the bolts in one direction the tension of the springs 39 will be increased and by turning the bolts in the opposite direction the tension will be relieved.

The pressure exerted upon the pressure ring 21 is transmitted from the centrifugally operated links 42 to the follower plate 35 and through the springs 39. This produces a yielding effect in the direction of the thrust which of course is desirable to realize a smoother and yet positive operation of the clutch.

It should be explained further that since the springs 39 are compressed between the pressure plate 21 and the follower plate 35 which plates move as a unit, the plate 35 may be moved to project the plate 21 against the driven friction element without causing further compression of the springs 39 and hence without increasing the tension thereof. Whether the springs 39 are further compressed depends upon the extent of their static compression between the plates. If the static force of the compressed springs exceeds that applied to the plate 35 by the inertia weights 30 incident to closing the clutch, then the springs 29 will not be compressed nor will the tension thereof be increased. The tension of the springs 36, however, is increased as a result of the clutch closing movement of the plates 35 and 21 and may be relied upon to retract the plates and to move the weights inwardly when the centrifugal force later becomes insufficient to overcome the influence of the springs 36. Assuming that the follower plate 35 is in contact with the nuts 61 by reason of spring tension in springs 39 and the clutch is in operating position, the manual effort necessary for a disengagement of the clutch is that force necessary to overcome the spring tension of springs 39. Also when the speed of rotation of the assembly is insufficient to move the weights outwardly against the resistance of springs 36, the pressure ring 21 exerts no clutching pressure because of the bolts 59 and nuts 61 which limit the separation of the ring 21 from the plate 35 under the influence of the springs 39. To change the range of expansion of the springs 39, the nuts 61 may be moved to the right or left on the bolts 59 as occasion demands. If turned to the left, viewed from Fig. 2, the tension of the springs 39 will be increased but their range of expansion limited or decreased. If turned to the right, as viewed from Fig. 2, the tension will be relieved and the range of expansion increased.

I claim as my invention:

1. In a clutch, driving and driven elements, a clutching element contributing to a clutching connection between said driving and driven elements, a pressure member to the rear of said shiftable clutching element for actuating said element, threaded bolts connected to said pressure member, manually operable means connected with said bolts for shifting said pressure member, a follower member through which said bolts extend with freedom of sliding movement, a yieldable connection between said pressure member and said follower member, a plurality of centrifugal weights to the rear of said follower member mounted to swing outwardly in response to centrifugal force, and thrust imparting link motions between said weights and said follower member.

2. In a clutch, a driving shaft, a flywheel mounted to rotate with said driving shaft and having a hollow interior, a cover for inclosing said interior, a driven shaft extending through said cover, a clutching element, means for automatically shifting said clutching element, said means comprising a plurality of centrifugal weights on said cover, an axially movable follower member, link motions connecting said weights with said follower member, a pressure member for actuating said clutching element, yieldable means connecting said follower member with said pressure member, and means for manually shifting said pressure member independently of the automatic means, comprising a plurality of bolts connected with said pressure member and slidably mounted through said follower member, a plurality of pivoted fingers connected with said bolts, an axially shiftable sleeve in surrounding relation to the driven shaft connected with said fingers and manually operable means for manipulating said sleeve.

3. In a clutch, driving and driven elements, an axially shiftable clutching element contributing to a clutching connection between said driving and driven elements, a pressure member for actuating said clutching element, threaded bolts connected to said pressure member and extending rearwardly thereof parallel to the direction that said pressure member is shiftable, manually controlled means cooperating with said bolts for shifting said pressure member, a follower member through which said bolts extend, springs coiled around said bolts between said follower member and said pressure member, link motions connected to said follower member, and centrifugal weights rearwardly of said follower member and connected to said link motions, said weights through the agency of said link motions being adapted to automatically shift said pressure member, said bolts being adjustable in the direction in which the pressure member is shiftable for determining the shifting range of the clutching element substantially as and for the purpose described.

4. In a clutch, driving and driven elements, a clutching member actuatable to establish a driving connection between said driving and driven elements, a pressure plate to the rear of said clutching member and axially movable for actuating said member to establish such driving connection, an axially movable follower plate rearwardly of said pressure plate and having cut-away sections therein, a yieldable connection between said pressure plate and said follower plate, a plurality of pivots rearwardly of said follower plate and movable with said driving element, centrifugal weights disposed on said pivots in a manner permitting of such weights swinging within said cut-away sections, connecting means between said weights and said follower plate, said weights being automatically operable through said connecting means to axially move said plates upon an increase in speed of the driving element, and manually operable means for shifting said pressure plate when the weights are in an outward position, said means comprising a spring resisted manually operable device, means connected with said pressure plate independently of the automatic operating means, and actuating means between said manually shiftable device and the means connected with the pressure plate.

5. In a clutch, a driving shaft, a hollow flywheel rotatable with said driving shaft, a driven shaft extending through the rear side of said flywheel, a clutch element movable axially on said driven shaft into operative clutching engagement with said flywheel, a pressure receiving member shiftable to effect such axial movement of the clutch element, a follower member having cut-away sections therein, yieldable connecting means interposed between said follower member and said pressure receiving member, pivots on said flywheel to the rear of said follower member, centrifugal weights on said pivots and adapted to swing within said cut-away sections, and connecting means between said weights and said follower member, said weights being operative through said connecting means to automatically shift said follower member and said pressure receiving member coincidental with an increase in speed of said flywheel.

6. In a clutch, driving and driven elements, an axially shiftable clutching element contributing to a clutching connection between said driving and driven elements, a pressure plate to the rear of said clutching element and axially movable to establish such clutching element in such connection, threaded bolts connected to and extending rearwardly from said pressure plate, a follower plate having cut-away sections therein, said bolts extending through a part of such cut-away sections, springs about said bolts and operative to maintain said plates in spaced relation, fulcrums carried by the driving element rearwardly of said plates, centrifugal weights pivotal about said fulcrums and movable in a part of said cut-away sections, said weights having an operative connection with said follower plate for imparting axial movement thereto and to said pressure plate incident to an increase in speed of said driving element, means on said bolts for changing the spaced relationship of said plates and hence the force normally exerted by said springs, and manually operable clutch actuating means coupled with said bolts.

KENNETH E. LYMAN.